Aug. 19, 1924.
O. JUNGGREN
1,505,647
PACKING FOR ELASTIC FLUID TURBINES AND THE LIKE
Filed Nov. 5, 1920
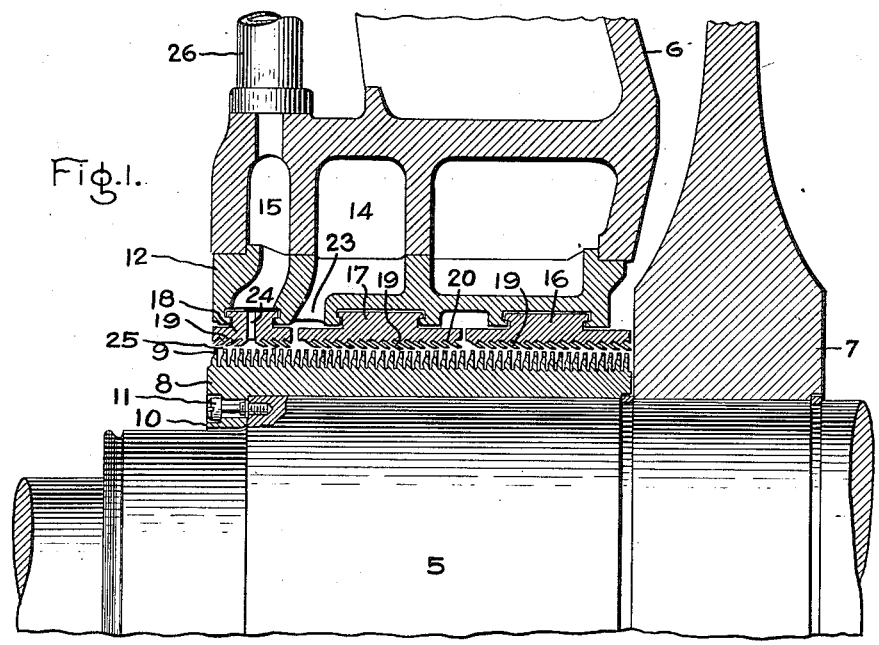
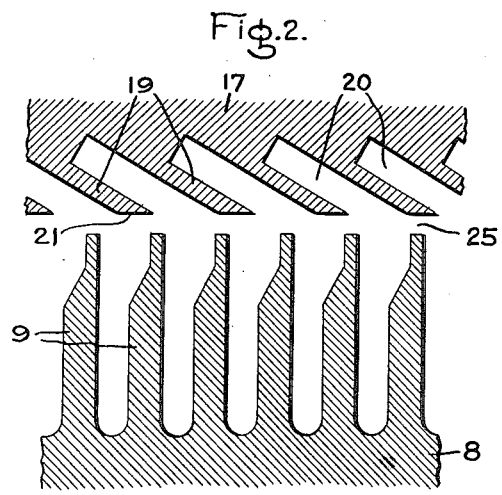
Inventor:
Oscar Junggren,
by
His Attorney.

Patented Aug. 19, 1924.

1,505,647

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

PACKING FOR ELASTIC-FLUID TURBINES AND THE LIKE.

Application filed November 5, 1920. Serial No. 422,009.

*To all whom it may concern:*

Be it known that I, OSCAR JUNGGREN, a citizen of the United States, residing at Schenectady, county of Schenectady, State of New York, have invented certain new and useful Improvements in Packings for Elastic-Fluid Turbines and the like, of which the following is a specification.

The present invention relates to packings such as are utilized between a rotating shaft and a stationary member through which it passes to prevent leakage around the shaft, one application of the invention being in connection with elastic-fluid turbines.

The object of the invention is to provide an improved structure and arrangement in a packing of this character and for a consideration of what I believe to be novel and my invention, attention is directed to the accompanying description and the claims appended thereto.

In the drawing, Fig. 1 is a sectional view of a packing embodying my invention, the lower half being omitted, and Fig. 2 is a view on a larger scale of a part of the packing.

Referring to the drawing, 5 indicates a rotating shaft, for example, the shaft of an elastic-fluid turbine, and 6 a casing or wall through which it projects and between which and the shaft it is desired to prevent leakage. In the present instance wall 6 is the high pressure end of a turbine casing and the first stage wheel of the turbine is indicated at 7. Only the upper part of the casing and packing is shown but it will be understood that the packing and casing extend entirely around the shaft.

The rotating element of the packing comprises a cylinder 8 having thereon a large number of fine-edged, annular packing teeth 9. Teeth 9 are close together and are formed integral with cylinder 8. For example, in actual practice there may be eight or ten teeth to the inch and each tooth may have a thickness of 0.060 of an inch at the base and 0.020 of an inch at the tip. It will be understood, of course, that the foregoing dimensions are given only by way of example and are not to be taken as a limitation of my invention. Cylinder 8 may be fastened on shaft 5 in any suitable manner. For example, it may be shrunk thereon and may be provided with an inturned flange 10 fastened by bolts 11 to a shoulder on the shaft.

The stationary element of the packing is preferably made in upper and lower halves as is customary being split horizontally at the axis of the machine. It comprises an annular holding member 12 suitably fastened in the opening in casing 6 and forming therewith a series of leakage chambers 14 and 15. Carried by holding member 12 are a number of packing rings 16, 17 and 18, the same being fastened to the holding member by dovetailed connections as shown, this being a well-known fastening arrangement. Packing rings 16, 17 and 18 are provided with annular packing teeth 19 which extend at an angle to the vertical, the teeth pointing in a direction against the direction of leakage. Packing teeth 19 may be formed integral with rings 16, 17 and 18 or they may be separate teeth suitably fastened thereto. Between the teeth are annular grooves 20 which, because of the angle of the teeth, slope in a direction opposite to the direction of flow of leakage fluid. Owing to the fact that the annular teeth are slanting or undercut it is evident that the inner end of each tooth can expand freely and in doing so will enlarge the diameter of the bore. As a result of this when any heating takes place due to rubbing, the tendency of the parts is to free themselves instead of moving toward each other and temporarily increase the heating as is the usual case. In the present instance the packing is shown as being used to prevent leakage of elastic fluid from the high pressure end of a turbine casing so the teeth 19 slope toward the interior of the casing, except in the case of a few of the outermost teeth of packing ring 18 which slope in the opposite direction to pack against the entrance of air.

In Fig. 2 I have shown a short section of the packing on an enlarged scale, the figure being, for example, on a scale about four times actual size. From this figure it will be seen that the ends of packing teeth 9 are quite sharp while the ends of the teeth 19 have flat surfaces 21 of considerably greater width than the ends of teeth 9. The ends of teeth 9 have close clearance with surfaces 21 and pack against them.

There is an annular passage between the adjacent ends of rings 17 and 18 and this passage communicates through an opening 23 with leakage chamber 14. Leakage fluid is carried away from chamber 14 by a suitable pipe (not shown), such fluid being utilized in any suitable manner as found desirable. In connection with packing ring 18 the outermost packing teeth slope in a direction opposite to that in which the others slope and in ring 18 between these two groups of teeth are one or more holes 24 which connect the annular spaces 25 between the groups of teeth with chamber 15. Leading from chamber 15 is a pipe 26 and a suitable means may be utilized to create a suction on this pipe so as to cause air to be drawn in around the outer end of the packing and out through hole or holes 24 to chamber 15 and also to cause the elastic fluid leaking past the inner end of packing ring 18 to pass to chamber 15. This arrangement thus serves to prevent leakage elastic fluid being discharged from the end of the packing directly to atmosphere, a thing which is obviously objectionable.

With the above described arrangement it will be seen that in the first instance I have the thin-edged packing teeth 9 packing against the flat surfaces 21 of teeth 19. This acts to limit the escape of elastic fluid around the shaft. In addition to this any elastic fluid escaping past a tooth 9 will be caught by a tooth 19 and deflected into one of the sloping annular grooves 20. The only way it can get out of such groove is to reverse its direction of flow which means that it must practically flow through itself. This very materially increases the resistance to flow through the packing. As a result by the combined action of the successive packing teeth and sloping annular grooves, the leakage is reduced to a minimum. To state the matter another way, a relatively great number of slanting teeth per unit length of shaft is provided and each annular tooth forms an obtuse angle with and presents a sharp edge to the oncoming fluid. As a result of this each of these sharp edges, so to speak, shaves off a thin layer of steam which flows up the inclined wall of the tooth and on striking the outer end of the groove is deflected backward toward the shaft and against the entering fluid thereby inducing whirls or eddies not only in the annular grooves 20 but also in the small radial clearance between the packing elements, thereby interposing a high resistance to the flow of fluid.

In actual use, such as is met with in connection with an elastic-fluid turbine, for example, the two elements of the packing may shift their positions axially relatively to each other and in order to insure maximum packing effect at all times, I make the number of packing teeth 9 per unit length greater than the number of packing teeth 19 per unit length, the numbers being incommensurate. This is clearly shown in Fig. 2. As a result there will always be a tooth 9 to pack against each surface 21 irrespective of the relative axial positions of the two packing elements obtaining at any particular time. Relative axial movements of the two packing elements does not therefore affect the efficiency of the packing. Furthermore such movements cannot bring the teeth into engagement with each other.

From a structural standpoint my improved packing has the advantage that there are no interleaving packing teeth. As a result the packing can be assembled or dismantled by telescoping the two packing elements directly into each other.

In addition to the advantages of the undercut slant tooth construction as regards packing, there is the further and very great advantage that in case of accidental rubbing of the packing members due to vibration or other abnormal conditions of the rotor, the heat generated by such rubbing causes the members to move away from each other in a radial direction thereby reducing the rubbing, instead of moving radially toward each other and thereby increasing the rubbing, as in the usual labyrinth construction. Owing to the slant of the teeth and to their thinness any local heating due to rubbing will cause said end to freely enlarge in diameter and thus the tooth as a whole will move outwardly and away from the inner member of the packing. The straight tooth on the shaft member will be heated of course, but to a much less extent because the point of contact will be small and the tooth in revolving will continually present new surfaces to the stationary tooth. Furthermore, the surface of the moving tooth will be cooled by the surrounding steam.

While I have described my improved packing structure as applied to the high pressure end of an elastic-fluid turbine, it may be used wherever found applicable. For example, it is well adapted for use as a diaphragm packing for an elastic-fluid turbine.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is,—

1. A packing comprising concentric, relatively rotating elements having packing teeth characterized by the fact that the teeth of one of the elements extend at an angle against the direction of flow of leakage fluid, and that the ends of the teeth of the said last-mentioned element have flat surfaces extending axially and at an angle to the lateral faces of such teeth against which the ends of the teeth of the other element pack.

2. A packing comprising concentric, relatively rotating elements having packing teeth characterized by the fact that the teeth of one of the elements extend at an angle against the direction of flow of leakage fluid, and that the ends of the teeth of the said last-mentioned element have flat surfaces extending axially and at an angle to the lateral faces of such teeth against which the ends of the teeth of the other element pack, the number of teeth per unit of length on the two elements being incommensurate.

3. The combination with a wall having an opening and a shaft pasing therethrough, of a packing for preventing leakage around the shaft comprising a plurality of thin-edged, radially-extending, annular packing teeth carried by the shaft, and a plurality of annular teeth carried by the wall, said latter teeth extending at an angle to the vertical and having flat, axially-extending end surfaces which lie at an angle to the lateral faces of such teeth against which the first named teeth pack.

4. The combination with a wall having an opening and a shaft passing therethrough, of a packing for preventing leakage around the shaft comprising a plurality of thin-edged, radially-extending, annular packing teeth carried by the shaft, a plurality of annular teeth carried by the wall, said latter teeth extending at an angle to the vertical and having flat, peripheral faces against which the first named teeth pack, the number of teeth per unit length on the shaft being greater than the number of teeth per unit length on the wall.

5. The combination with a wall having an opening and a shaft passing therethrough, of a packing for preventing leakage around the shaft comprising a plurality of thin-edged radially-extending, annular packing teeth carried by the shaft, a plurality of packing rings carried by the wall, angularly-extending packing teeth carried by said rings and cooperating with said first named teeth, the teeth on the outermost packing ring extending in opposite directions, and means forming an annular chamber surrounding said outermost packing ring, which ring is provided with an opening communicating therewith.

6. A shaft packing comprising a rotating element having a large number of closely associated packing teeth and a stationary element having a large number of closely associated annular packing teeth, the packing teeth of one of said elements extending radially and having thin, sharp edges, and the packing teeth of the other of said elements extending at an obtuse angle to provide annular, sloping grooves which face in the direction of flow of leakage fluid, the ends of the teeth of said last-mentioned element having flat surfaces extending axially and at an angle to the lateral faces of such teeth against which flat surfaces the ends of the first-mentioned teeth pack.

7. A packing comprising concentric relatively-rotating elements which are separated by a small radial clearance, one of said elements having sets of slanting teeth, those in one set slanting in one direction with respect to the axis of the packing to reduce leakage from one end, and those in another set slanting in the opposite direction to reduce leakage from the other end, the second element having teeth which extend perpendicularly to said axis and cooperate with said sets of slanting teeth.

In witness whereof, I have hereunto set my hand this 4th day of November, 1920.

OSCAR JUNGGREN.